(No Model.)
R. A. BREUL.
CHAIN.
No. 564,406.       Patented July 21, 1896.
Fig. 1.        Fig. 2.        Fig. 3.
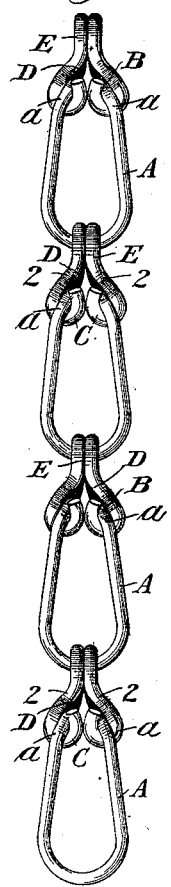 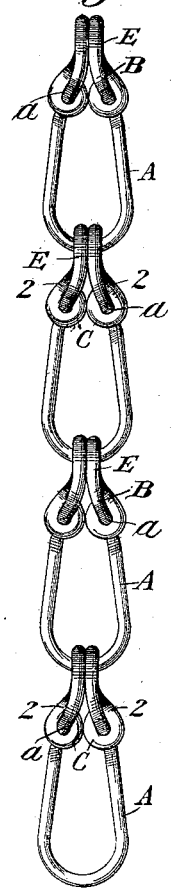 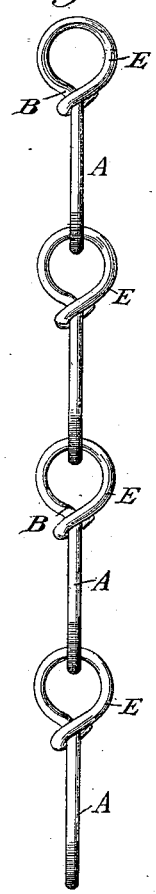
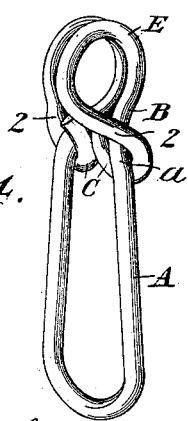    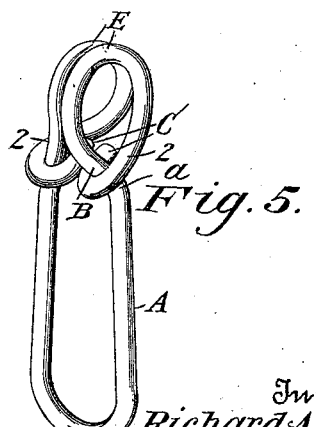
Fig. 4.        Fig. 5.
Witnesses                           Inventor
J. M. Witherow                      Richard A. Breul,
E. H. Dalloch      By his Attorneys
                   Baldwin, Davidson & Wight.

UNITED STATES PATENT OFFICE.

RICHARD A. BREUL, OF BRIDGEPORT, CONNECTICUT, ASSIGNOR TO THE BRIDGEPORT CHAIN COMPANY, OF SAME PLACE.

CHAIN.

SPECIFICATION forming part of Letters Patent No. 564,406, dated July 21, 1896.

Application filed December 1, 1894. Serial No. 530,521. (No model.)

*To all whom it may concern:*

Be it known that I, RICHARD A. BREUL, a citizen of the United States, residing at Bridgeport, in the county of Fairfield and State of Connecticut, have invented certain new and useful Improvements in Wire Chains, of which the following is a specification.

Chain made in accordance with my present invention has each of its links made of a single piece of wire bent to form a loop with a transversely-arranged eye at its end, to which the loop of the next link is joined. The eye of each link is formed by bending the free ends of the wire in the same plane in planes perpendicular to the plane of the loop in such manner as to form two coincident and for the most part parallel coils.

The wire at the ends of the coils is hooked around the wire at the adjacent end or neck of the loop, and made to encircle, or substantially encircle it, the extreme ends of the wire being arranged in the triangular space formed at the inner end of the coils. The ends of the wire fill this triangular space and lie closely against each other, bracing the loop and the coils and forming a smooth flat surface which not only affords a bearing-surface when the chain is used as a sprocket-chain, but also covers the ends of the wire, preventing their chafing or scratching any object with which the chain may come in contact, and also preventing the ends of the wire from catching in any object which would tend to open the hooks and thus release them from the loop and cause the separation of the links of the chain.

In the accompanying drawings, illustrating my invention, Figure 1 is a front view of my improved chain. Fig. 2 is a rear view thereof; Fig. 3, an edge view. Figs. 4 and 5 are perspective views, on an enlarged scale, of one of the links.

Each link of the chain is formed from a suitable blank, bent at its center to form a loop A, the ends being offset and brought together to form the shank B, and curved to form the two coils E constituting the eye.

The ends of the coiled wires are bent around the sides of the loop, curving from the outside inwardly through the loop, and completely embracing the sides thereof at the shank, which are offset at $a$, as indicated.

For the most part the coils lie parallel and in close contact with each other, but are deflected outward at the points 2 in order that the ends of the wire may be bent around the sides of the loop. This forms a triangular space D, but this space is filled by the ends of the hooks C, which lie in close contact with each other, their ends being arranged within the plane of the two outside portions of the hooks. By this arrangement a smooth surface is formed on the front of the chain, where the ends of the coils join the loop.

It is obvious that a material advantage is gained by bending the ends of the wire from the outside inwardly through the loop, and into the triangular space D. If the wires were bent in the opposite direction, their extreme ends would be exposed and would tend to scratch, chafe, or catch in objects, which would tend to open the hooks and release the fastenings.

A chain constructed in accordance with my present invention not only has the advantages above named, but the entire tensile strength of the stock employed is utilized, any separation of the ends of the wire from the loop being impossible, and the arrangement is such as to approximately preserve the shape of the chain even under abnormal strain.

I claim as my invention—

A chain, each link of which is made from a single piece of wire bent to form a loop having an eye at one end formed by curving the free ends of the wire in the same direction in planes perpendicular to the plane of the loop to form two coincident coils, the free ends of which are bent around the adjacent offsets at the ends of the loop and made to project into the triangular space formed between the loop and the coils, substantially as and for the purpose specified.

In testimony whereof I affix my signature in presence of two witnesses.

RICHARD A. BREUL.

Witnesses:
D. F. TOOHEY,
N. BOTSFORD.